Aug. 27, 1929.  L. OBER  1,726,307
NUT AND BOLT ASSEMBLING MACHINE
Filed Oct. 23, 1924  7 Sheets-Sheet 1

Fig.1.

Inventor
Leonard Ober
By
Sturtevant & Mason Attorneys

Aug. 27, 1929.                L. OBER                  1,726,307
               NUT AND BOLT ASSEMBLING MACHINE
            Filed Oct. 23, 1924        7 Sheets-Sheet 2

Fig. 2.

Inventor
Leonard Ober
By
Sturtevant & Mason  Attorney

Patented Aug. 27, 1929.

1,726,307

UNITED STATES PATENT OFFICE.

LEONARD OBER, OF BALTIMORE, MARYLAND, ASSIGNOR OF ONE-HALF TO ALBERT U. WALTER, OF BALTIMORE, MARYLAND.

NUT AND BOLT ASSEMBLING MACHINE.

Application filed October 23, 1924. Serial No. 745,426.

This invention relates to a completely automatic machine for assembling nuts and bolts, in which the bolts and nuts are fed into the machine, and are automatically acted upon by the mechanism so that the bolts are continuously carried along from the delivering station to a discharging station, and while so moving, have the nuts automatically threaded thereupon, so that when the bolts and nuts reach the discharging station, they are ejected in an assembled condition.

One of the broad features of this invention resides in providing a completely automatic and continuously operating machine for threading the nuts on to the bolts, which operations are carried out mechanically without the aid of attendants.

Still another object of this invention resides in providing a nut and bolt assembling machine of the above character, wherein the bolts are automatically fed into the machine, are carried along to a discharging station, and at the same time, nuts are automatically fed into the machine, are threaded on to the bolts without cessation of movement, the particular feature residing in the means for holding the nuts and bolts so that they can properly center themselves during the threading on operation, thereby automatically compensating for irregularities in the nature and position of the threads on the nuts and bolts, respectively.

Still a further object of this invention resides in providing such a completely automatic and continuously operating machine wherein nuts are automatically fed to nut chucks and bolts to bolt jaws, together with mechanism for automatically positioning and operating the nut chucks relatively to the bolt jaws to thread the nuts on to the bolts, provision being made to prevent breakage of the machine upon failure of the nut to thread properly upon a bolt.

Still another feature of the invention resides in the means for automatically raising and lowering the nut chucks as they travel by the bolt discharging station, the nut indexing station, and the nut and bolt stations, which raising and lowering operation is provided for facilitating the discharge of the assembled nut and bolt, the proper indexing of the nut chuck to receive the nut, the proper elevation of the nut chuck to pass beneath the nut and bolt chutes, and finally, the rise of the nut chuck after it passes the bolt chute to provide the engaging movement between the nut and the bolt.

Yet another feature of this invention resides in the means for rotating the nut chucks as they travel along, and particularly the means for rotating these chucks while permitting the rise and fall thereof.

Yet another feature of this invention resides in the friction belt driving means for rotating these nut chucks, which driving means includes a spring tensioning device for putting a uniform tension on the belt, thereby eliminating the necessity of constantly adjusting the belt. In addition to this, spring tensioning means permits a change in the length of the belt which encircles the series of nut chucks as the turret rotates so as to maintain a uniform tension on the nut chucks for all positions of said nut chucks in the rotation of the turrets.

A further object of the invention resides in the means for holding the bolt in the bolt jaws so that the lowermost end of the bolt is free to move laterally or float to facilitate the positioning of the bolt in the nut, and further to permit the bolt to turn in the bolt jaws upon the action of a faulty threading operation. In addition to these features, the manner of holding the bolt by the shank instead of by the head permits the machine to accommodate bolts of varying length and of any shaped head.

Still another feature of the invention resides in the construction of the nut receiving sockets on the bolt chucks, which nut receiving sockets are constructed and arranged so that when the nuts are transferred into the nut sockets from the nut chute, they can automatically center themselves to facilitate the threading operation.

Yet another feature of the invention resides in the particular construction of the open nut pocket preferably made up of a series of spaced upstanding pins so that the nut pocket is kept free from dirt and other grit.

Yet a further feature of the invention resides in the manner of spacing these pins apart a greater distance than the length of the side of the nut, thereby aiding the centering movement, and furthermore, in the arrangement of a conical centering surface centrally of these pins, which centering surface is constructed and arranged to automatically position the nut in the nut pocket.

Yet another feature of the invention resides in the providing of the nut chuck with a pocket adapted to receive a square or hexagonal nut and also providing an operating indexing means for positioning the pocket so that the nut will drop therein when pushed from the delivery chute.

A further feature of this invention resides in the mechanism for automatically transferring a nut from a nut chute to the nut chuck, and particularly in the means for mounting the nut chuck to pass under the nut chute and in mounting the nut transferring finger over the nut chute.

Yet a further feature of this invention resides in mounting the nut chuck for vertical movement so that when it passes under the nut chute, it will be depressed vertically thereby, in case a defectively threaded nut has been left in the nut pocket.

A further feature of the invention resides in the specific construction of the bolt chute which is adapted to position the bolt vertically upright as it passes down the chute into position to be transferred to the bolt jaws and in the spring fingers for wiping the bolt into the bolt jaws on movement of the bolt carrier past the bolt chute.

Still a further feature of the invention resides in the manner of constructing and operating the bolt jaws for opening and closing the same to receive, to hold and to permit the discharge of a bolt therefrom, together with a single cam arranged to operate the bolt jaws sequentially as they travel around on the traveling carrier.

Still a further feature of the invention resides in the spring arms adapted to raise the nut chucks to their uppermost limit of travel to thereby force the nut therein into contact with the bottom end of the bolt to initiate the threading operation, together with a cam for lowering the nut chucks at a predetermined time.

Still another object of the invention resides in the construction of the bolt ejector, and in the relation of the cam thereto for permitting the nut chucks to drop at the discharge station, the discharging finger being constructed and arranged to be placed under spring tension by contact with the bolt as it approaches the discharging station, and together with the mechanism for opening the bolt jaws to permit the spring pressed ejector to kick out the assembled nut and bolt at the discharge station.

These and other objects of the invention will be apparent from a perusal of the following specification when taken in connection with the accompanying drawings, wherein.

Figure 1:
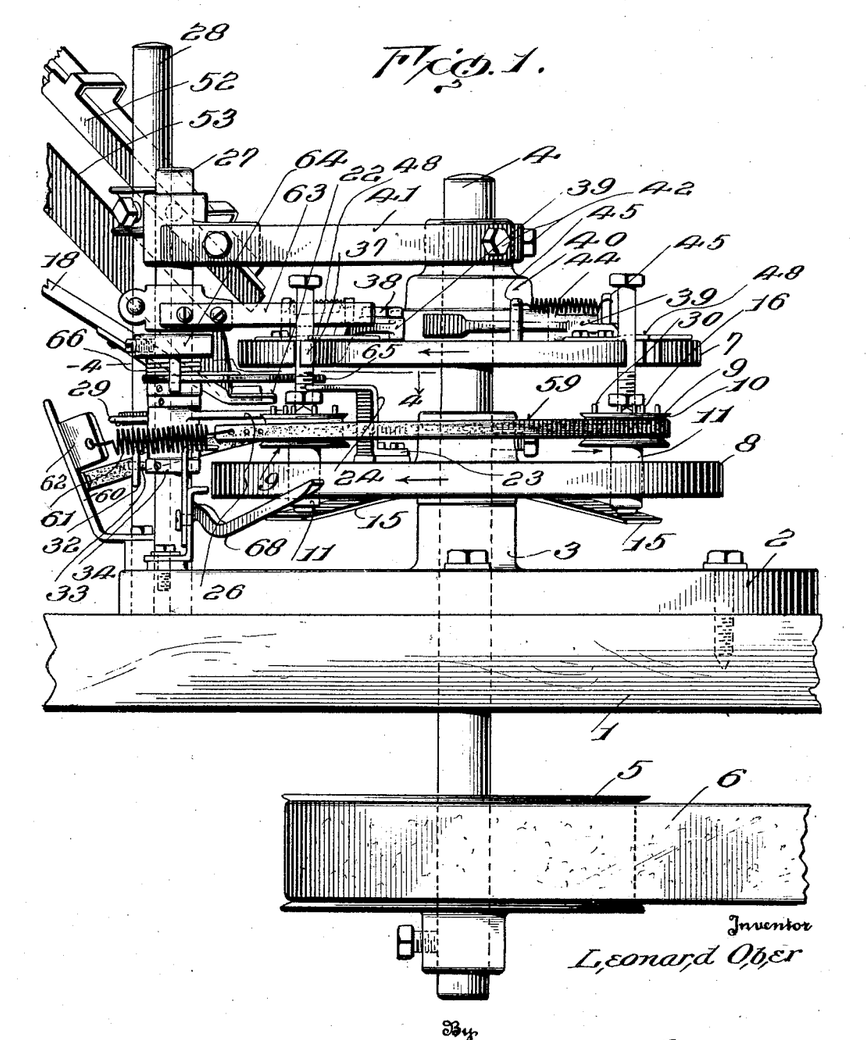
Figure 1 is a side view of the entire mechanism, certain of the parts being broken away.
Figure 2:
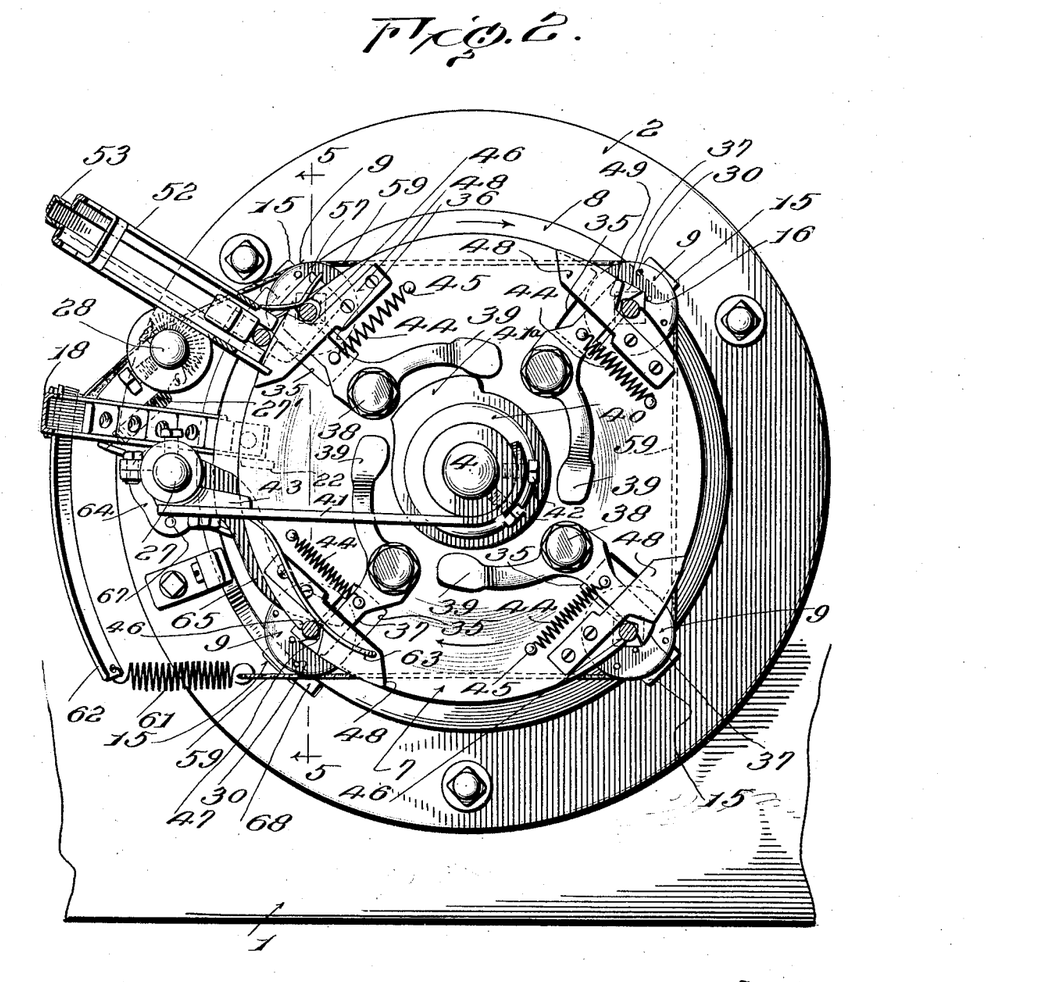
Fig. 2 is a plan view of the same.

Referring now to the drawings in detail, the invention, while capable of many different embodiments, consists generally in a supporting member on which is mounted a traveling carrier, which traveling carrier in turn supports the nut chucks and the bolt jaws in registering relation thereon. Means is provided for rotating the nut chucks as they travel along on the traveling carrier, for providing a relative movement between the nut chucks and bolt jaws for bringing the nuts into contact with the bolts and thereafter utilizing the rotation of the nut chucks relatively to the bolt for threading the nuts upon the bolts. In addition, means is provided for automatically feeding nuts to the nut chucks and bolts to the bolt jaws. In the present instance, this means consists of inclined chutes and automatic transferring means. The machine is constructed and arranged to operate continuously and automatically in its function. With reference to Fig. 1, the drawing discloses a supporting member 1 on which is bolted a metal base 2 having an upstanding bore 3 through which passes the main drive shaft 4, this drive shaft being operated by any suitable pulley, such as 5, from a belt 6 running from a source of power. The traveling carrier in the specific form illustrated comprises a rotatable turret fixed on the shaft 4 and rotated thereby. In the preferred form, this rotatable turret comprises upper and lower disks 7 and 8, respectively. The upper disk 7 carries the bolt jaws for holding the bolts, while the lower disk 8 carries the nut chucks for receiving the nuts. The nut chucks and bolt jaws are preferably mounted on the peripheries of these two disks 7 and 8, and in vertical registration, so that as the turret comprising these disks 7 and 8 revolves, the chucks and the vertically superimposed bolt jaws are rotated in synchronism past the various operating stations hereinafter described. This turrent revolves continuously at a uniform speed, and the various operations of automatically feeding in the nuts and bolts, assembling them and discharging them from the machine, are carried out as a continuous process without interrupting the movement of the turret.

The nut chucks.

The nut chucks which are of any desired number and construction are mounted at spaced intervals on the lower disk 8 near the peripheral edge thereof. Each chuck preferably comprises a spool 9 provided with inclined circumferential flanges 10. In order to carry out the nut and bolt assembling and other operations, it is necessary that these nut chucks be permitted to rise and fall at predetermined times, and while this vertical movement may be carried out in many variant ways, a simple construction is provided by rigidly mounting each spool 9 on the spindle 11 by means of a set screw 12. The spindle 11 has a shoulder 13 to provide a seat. A spring 15 attached to the base of the disk 8 at a suitable point is arranged beneath the depending end of each spindle 11 so as to normally press the spindle and its nut chuck upwardly to a maximum vertical position. It will be understood, of course, that other actuating means may be used instead of the spring 15.

Figures 7, 8:
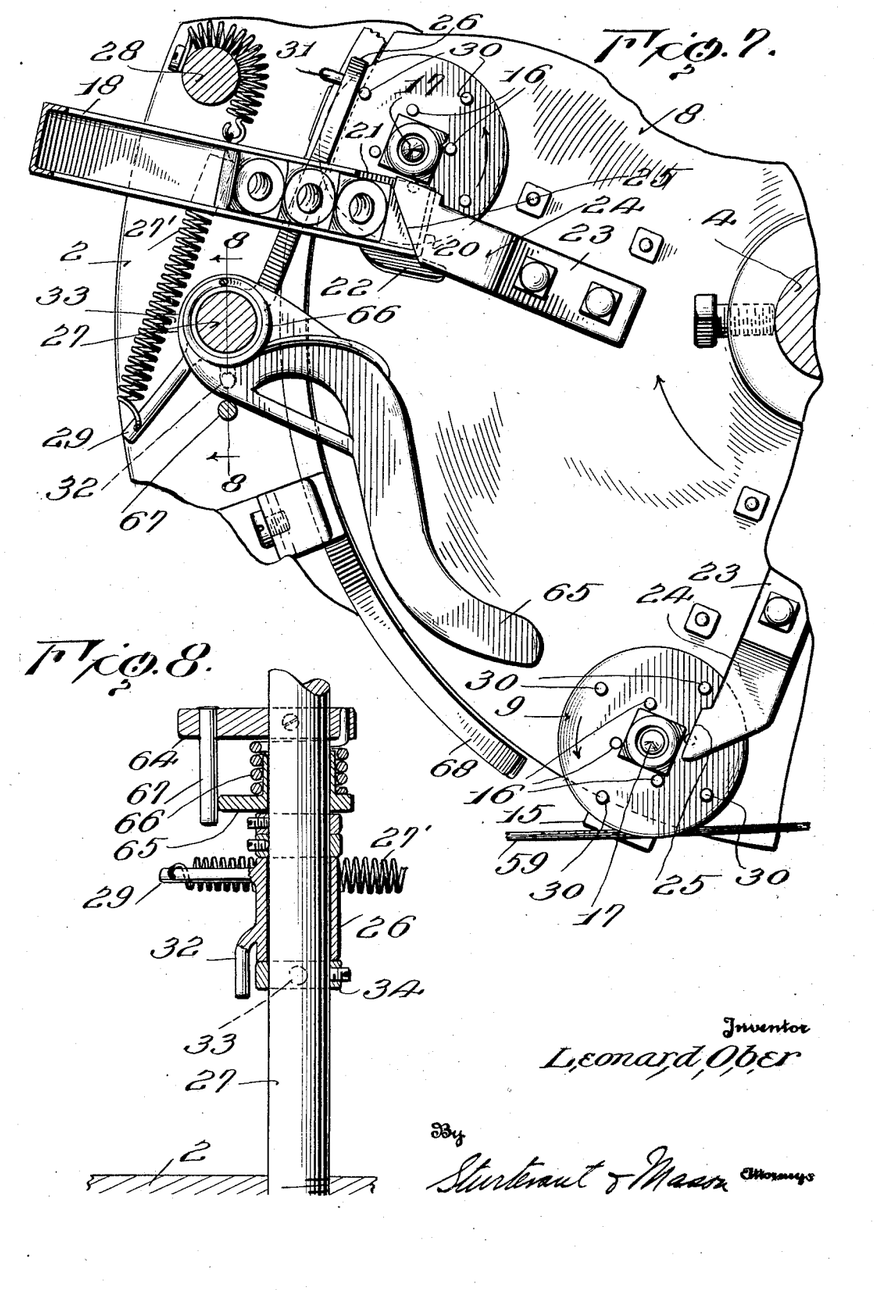
Fig. 7 is a plan view showing the nut chute and the manner of transferring the nuts from the nut chute to the nut chucks.
Fig. 8 is a section on the line 8—8 of Fig. 7.

The upper faces of the spools 9 are constructed to provide nut receiving pockets. These pockets are formed in a very simple manner by four or more upstanding projections 16 suitably spaced apart as shown for instance in Fig. 7 of the drawings, the spacing being arranged so as to permit the nut to have a slight lateral shifting movement in its pocket. The upper face of the spool centrally of these pins is provided with an upstanding pin having a conical nose or head 17 as shown in Fig. 7. The arrangement of this conical pin and the spacing of the pins 16 permits the nut to automatically center itself in the socket of the nut chuck so that a correct positioning of the nut is assured.

Automatic means for feeding nuts to chucks.

Figure 3:
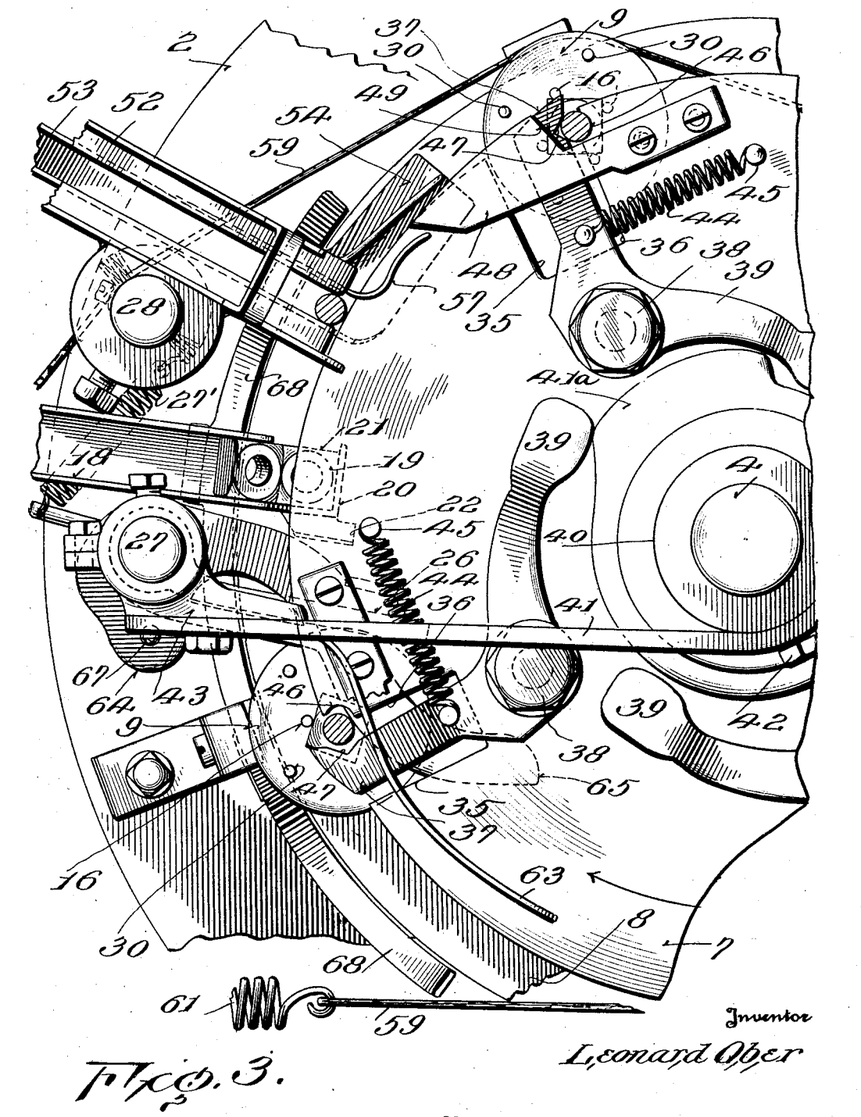
Fig. 3 is an enlarged plan showing the nut and bolt chute stations.
Figure 4:
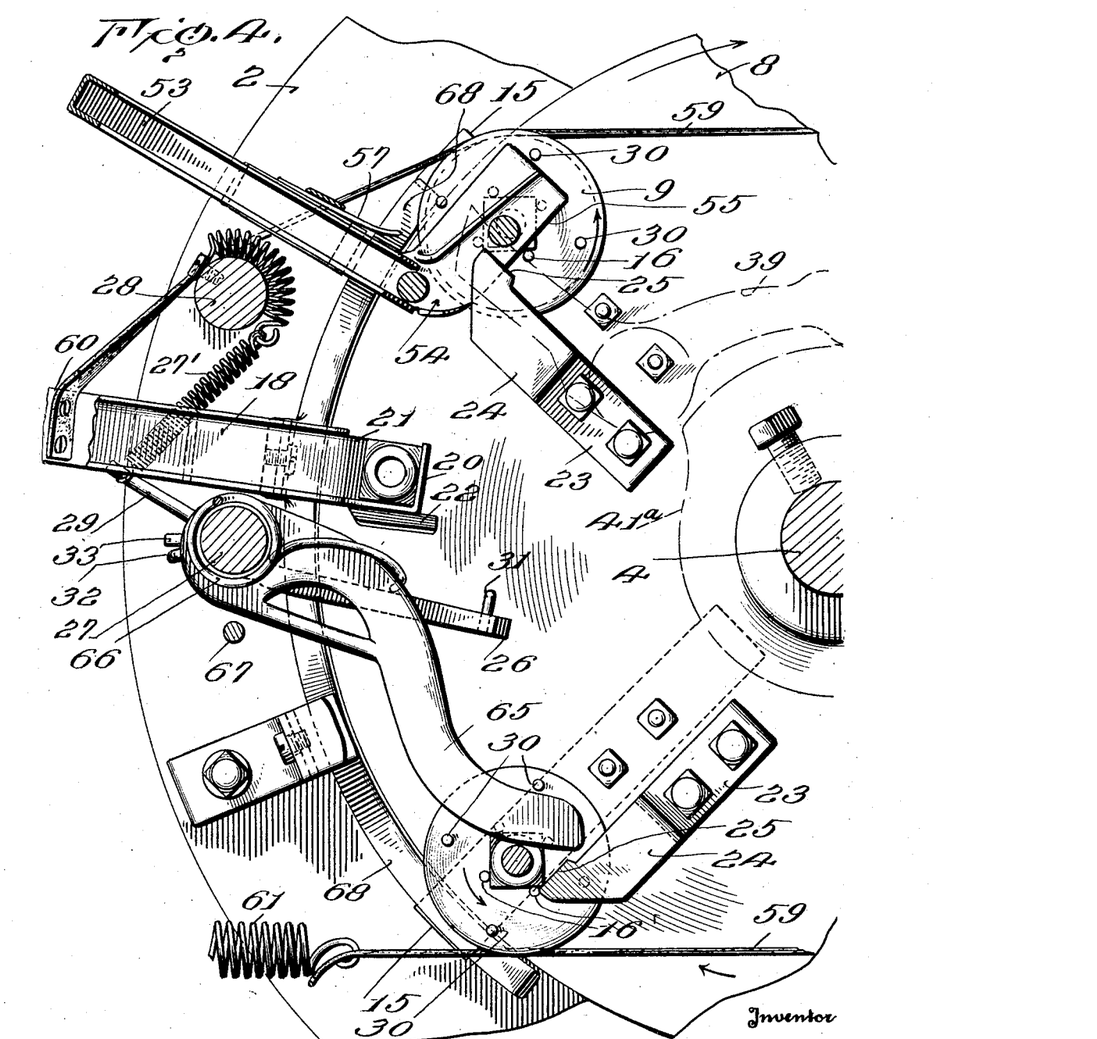
Fig. 4 is a section on the line 4—4 of Fig. 1.
Figure 5:
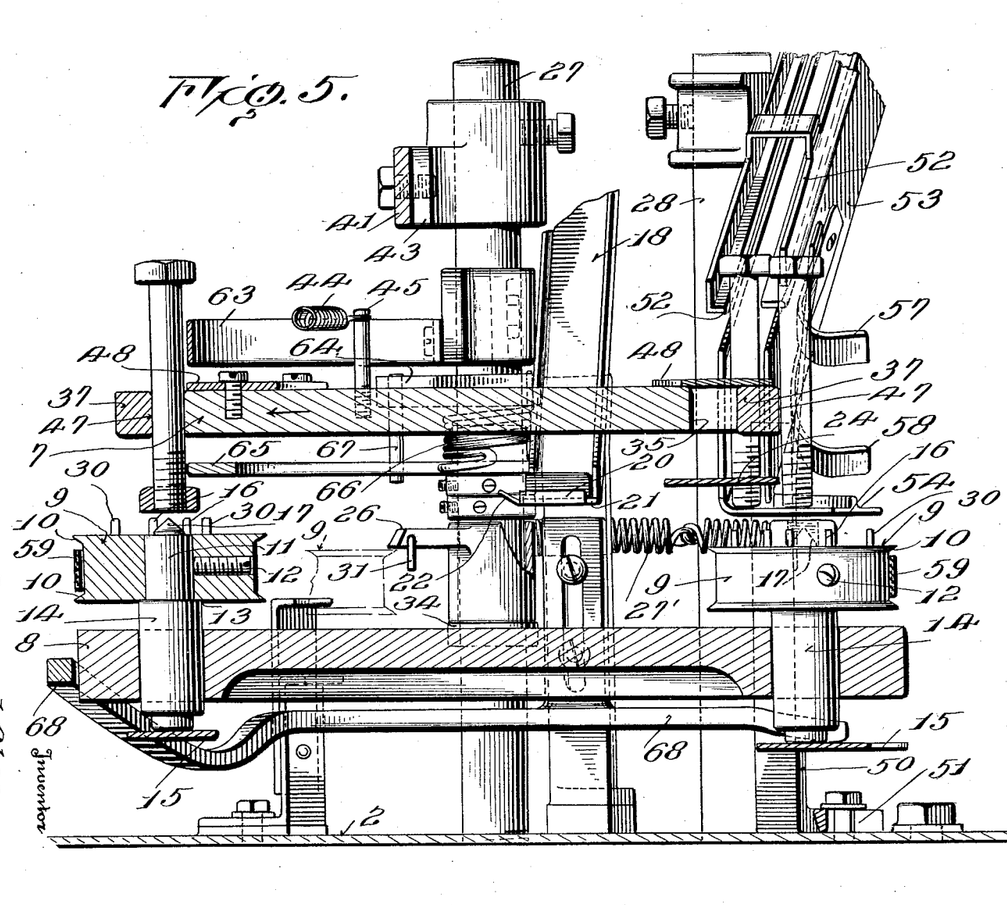
Fig. 5 is a section on the line 5—5 of Fig. 2.

Mounted on the support 2 at the edge of the lower disk 8 is an upright or standard for supporting the nut chute 18. This nut chute is inclined downwardly and terminates in elevated position between the upper and lower disks 7 and 8 and preferably in elevated position over the lower disk 8 of sufficient extent to permit the passage of the nut chucks thereunder as they travel around with the turret. This is shown in Fig. 1. The lower end of this nut chute terminates in a horizontally disposed nut ledge 19. As shown in Figures 3 and 5, this ledge is formed opposite the runway of the chute with an abutment flange 20 to position the nut radially of the machine. That portion of the ledge designated as 21 is open so that the nut can be forced out of the guideway at this point. Opposite this cut away portion 21, the ledge is provided with a laterally projecting flange 22 having an upwardly curved edge, which serves to deflect the nut chuck under the ledge in case the nut chuck has not properly dropped to lowered position prior to reaching the nut station. This ledge is a safety device to prevent jamming of the machine. It will be understood that the nuts fall by gravity down the chute 18 and are positioned one at a time at the mouth 21 of the ledge, so that they can be moved therefrom by the transferring means.

In order to translate the nut from the chute into the nut chuck, each chuck is provided with a Z-shaped transferring finger 23 secured to the top face of the disk 8. The upper end 24 of this Z-shaped finger 23 is arranged to overhang a nut chuck and is spaced thereover sufficiently high to just pass over the upper face of the nut chute as the disk 8 carrying it passes across the nut chute. The inner face 25 of this upper end 24 is positioned accurately with respect to the central axis of the nut chuck, so that when the nut chuck is properly indexed, which is prior to the instant it reaches the nut chute, the face 25 will come in contact with the edge of the nut in the chute and force it from the open mouth 21 of the nut chute into the pocket formed by the pins 16 and over the conical pin 17. The indexing mechanism preferably comprises an oscillating finger 26. This finger is mounted on a post 27 supported in the base 2 at the peripheral edge of the disk 8. This finger is mounted in the path of movement of each chuck so as to contact with predetermined portions of the chuck, and thereby move the chuck rotatably on its axis to a desired position. In the contacting movement, the finger 26 is pivotally swung by the passing chuck to an out of the way position, thereby permitting the chuck to pass on, the finger being returned to normal position in the path of movement of the next chuck by means of a spring 27'. This spring 27' may be placed around an anchoring post 28 and is connected at its other end to a lateral stud 29 forming a part of the finger 26. The finger preferably co-acts with upstanding pins 30 formed on the upper face of each chuck. These pins are arranged at spaced distances, the disposal being such that the chuck will always be angularly turned on its axis to register the socket formed by the pins 16 with the nut ledge 19 as the chuck passes under the ledge. In other words, the side 20 of the ledge will be parallel with the corresponding side of the nut pocket. In order to prevent the index finger, when released by one of the upstanding projections, from striking the nut, I have provided a depending finger 31 (see Fig. 7) which contacts with the face of the spool and thereby the index finger is held until it has passed the projection.

The bolt jaws.

As before stated, the bolt jaws are formed on the upper disk 7 in superimposed registering relation with the nut chucks, so as to be carried around by the turret in timed relation with the nut chucks past the various operating stations. While these bolt jaws may be of many desired constructions, it is though that the simple arrangement disclosed in the present drawings presents a very practical operating device. Each jaw is preferably formed of a stationary portion and a movable portion. To this end, the periphery of the upper disk 7 is cut away as at 35 to provide an open ended slot having oppositely facing walls. The width of this slot is sufficient to accommodate a movable jaw 37 which works therein toward and away from one of the walls 36 which constitutes the stationary jaw. This movable jaw 37 is pivotally mounted on the upper face of the disk 7 as at 38, and at its inner end is provided with a lever 39 which extends into the path of a centrally located cam 40 mounted stationarily on the central rotatable spindle 6. This cam is held from angular movement by means of a bracket 41 attached to the cam as at 42, and to the post 27 by means of a detachable collar 43. A spring 44 is connected to the jaw 37 and to a pin 45 on the upper face of the turret. This spring normally pulls the movable jaw into closed position against the stationary jaw 36. The opposing faces of the stationary and movable jaws are suitably notched as at 46 and 47 to provide a firm gripping engagement with the bolt. The tension of the spring 44 is regulated so that the bolt will be able to frictionally turn in the jaws, if there be a defective threading on either the nut or the bolt, and it also prevents forcing the nut on to the bolt. This prevents jamming of the machine, as will be hereinafter evident. It will be noted that the movable jaw 37 curves downwardly from its pivotal point 38 and enters the cutout slot 35, at which point the upper surface of the movable jaw is in the same plane with the upper surface of the disk 7. This construction permits the guard plate 48 to be fastened across the cutout portion 35 of the disk and prevents the bolts from passing into the slot behind the working face of the movable jaw 35.

*Means for automatically feeding bolts to the bolt jaws.*

Figure 6:
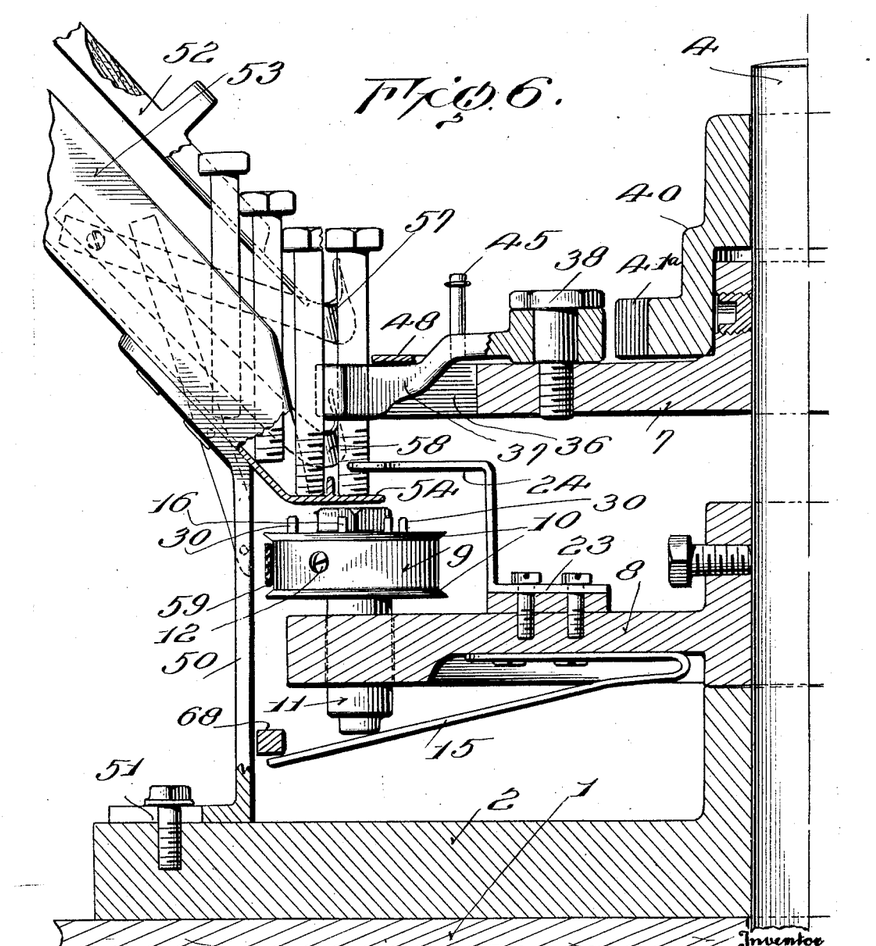
Fig. 6 is a view showing partly in section the support, the end of the chute for the bolts, the rotating carrier, the supporting part of one of the clamping jaws, and other features adjacent the jaws, the carrier being positioned adjacent the end of the bolt chute when this figure was made.

In order to feed bolts to the bolt jaws as they pass around with the movable turret without interruption, a suitable bolt chute is arranged in supported relation on the base 2. In Fig. 6, there is shown an upright 50 which is adjustably mounted as at 51 on this base so that the bolt chute may be spaced a desired distance from the periphery of the lower disk 8 and in proper relation to its vertical position between the upper and lower disks 7 and 8. If desired, the vertical height of this standard 50 may also be adjustable. This bolt chute consists of upper and lower inclined ways. The upper inclined way comprises two spaced guides 52 which are spaced apart sufficiently to accommodate the shank of the bolt, but not the head. In this manner, the bolt is permitted to slide down this upper chute, hanging therefrom by means of its head. Beneath this upper chute is arranged the lower inclined guideway 53 which is spaced just the correct distance so that the lower end of the bolt will be supported on this lower way, and will thereafter, when sliding down the two ways, be maintained in a vertical upright position. The lower guideway 53 terminates in a bolt ledge 54, which extends arcuately parallel to the periphery of the lower disk 8 and in advance thereof, considering the same in a clockwise direction. This ledge is for the purpose of supporting the bolt as it passes from the bolt chute and holds the bolt at the proper height until it is gripped by the bolt jaws. Suitable means is provided for guiding the bolt as it is moved along said ledge. In addition to this ledge for supporting and guiding the lower end of the bolt, spring fingers are also provided for automatically and positively wiping or pressing the bolt as it slides down the chute and into position on the ledge, into the opened bolt jaws. As shown clearly in Fig. 5, there are two of these fingers, an upper finger 57 and a lower finger 58. These fingers are made fast to the bolt chute. It will be manifest that in positioning these fingers as shown in the drawings, they function to support the bolt and maintain it from tilting. The inner end of the upper finger is arranged over the upper turret disk 7 and presses inwardly against the bolt when in lowermost position. The lowermost portion of the lower finger is situated below the upper disk 7 and slightly into the path of the bolt track on the ledge. With this construction, it will be noted that the top of the bolt chute supports the bolt heads so that they can slide down the upper chute. If the bottom chute were not present, the bolts would ride down the upper chute and tip forward against the periphery of the turret disk 7. But with the bottom chute present, the face of the incline of the chute prevents the bottom of the bolt from tipping back as it approaches the turret. Hence the bolt is held positioned at three points. First, the upper chute prevents it from tipping back; second, the periphery of the turret prevents it from tipping forward; and third, the guiding means on the ledge prevents any forward movement of the lower end of the bolt. Furthermore, the spring finger 57 holds the bolts in the chute and against the edge of the turret so that the bolts can escape only one by one. With the upright bolt thus positioned against the periphery of the turret, the bolt will ride on the periphery until the cutout notch 49 of the chuck jaw guard approaches. At this moment, the slightly projecting nose of the movable jaw 37 wipes the bolt against the two springs 57 and 58, and these springs in turn push the bolt into the open notch between the stationary and movable jaws. The movable jaw is still open at this time to permit the bolt to settle on to the lateral arcuate extension of the bolt chute, and thereby determine that position of the bolt which is gripped by the bolt jaws when they close. As soon as the central cam 41ª on continued rotation of the turret, actuates the lever 39, the movable jaw 37 is closed and grips the bolt. This closing movement occurs before the bolt leaves the arcuate chute ledge, and thus keeps the settled level of the bolt and maintains it suspended in proper horizontal position over the nut positioned thereunder. Particular attention is called to the fact that the bolt jaws provide a friction grip for the bolt, which grip holds the bolt in a sort of floating condition, so that the lower end of the bolt is more or less free to accommodate itself to slight lateral movements, which are requisite to a proper threading of the nut on the bolt. This means for floatingly holding the bolt especially cooperates with the particular construction of the nut chuck whereby the nut also can shift laterally slightly.

Automatic nutting operation.

As the bolt leaves the bolt ledge on rotation of the turret, it will be observed that the nut which has been properly positioned in the nut chuck lies in the chuck spool immediately beneath the positioned bolt. At this time, it is necessary to give the nut chucks rotational movement in order to spin the nut. In the preferred form of arrangement, this is accomplished by a belt drive, although obviously it may be carried out by other mechanical arrangements. The belt 59 is arranged to substantially encircle the periphery of the rotating turret, and to this end it is anchored to a support 60 fastened on the base 2. From this point, the belt passes around the turret between the upper and lower disks in a position to lie between the upper and lower flanges 10 of the chuck spools. The opposite end of the belt is connected to a tension spring 61 which in turn detachably connects to an arm 62 carried by the support 18. This construction permits the belt to shift under tension and change its encircling outline and length to accommodate the constantly shifting chuck spools as they travel around with the turret, and the tension spring also eliminates any necessity for adjusting the belt, which necessity for adjustment would arise as a result of constant use, if the tension spring were not present. In addition, this arrangement of belt drive, together with the spaced spool flanges 10 on the chuck spools permit the rise and fall of the chuck spools as will be hereinafter described. This latter construction is an important feature of the invention. It will be noted that the width of the belt is less than the space between the spool flanges 10, which aids in accommodating the rise and fall of the spools.

Allusion has already been made to the springs 15 located beneath each chuck spindle for the purpose of pressing the chuck spools into their uppermost position, and also to the fact that these chuck spools are vertically shiftable in the lower disk 8 and freely drop into lowermost position, due to their own weight. Substantially at the instant the bolts leave the arcuate ledge after having been firmly gripped, the springs 15 are permitted to force the nut chuck spindles upwardly. This upward movement contacts the hole in the nut with the lower end of the bolt. At this time, the floating mounting of the bolt and the centering means for the nut function cooperatively with the rotation of the chuck spools by the belt drive as the turret rotates, so that the rotating nut is brought into threading engagement with the lower end of the stationary bolt, and as these spools rotate along on the stationary yieldable belt, due to the rotation of the turret, the nut is gradually threaded on to the bolt. This threading operation takes place while the carrier or turret is traveling a predetermined distance. Thus, for instance, while the turret is rotating from a point slightly removed in a clockwise direction from the bolt ledge to a point which describes nearly three-quarters of a circle, and at which point the ejector is located. It is obvious that by a proper arrangement of nut chucks and diameter of spools as well as the length of the centering cone with respect to the driving means for the nut, any desired extent of threading may be accomplished, as the cams will depend directly upon the number of revolutions a particular nut chuck will make in traveling around on the turret. When the nut chuck has arrived at the ejecting station, the nut has been suitably threaded upon the bolt and the bolt is ready to be ejected.

The ejecting mechanism.

The ejecting mechanism is arranged to automatically discharge the assembled nut and bolt from the machine while the turret continues its rotation. This is effected by means of an ejecting finger 65 which is normally pressed outwardly toward the periphery of the turret by a spring 66 and is limited in its movement by a stop 67. This spring finger 65 is curved so that, as the turret rotates, the shank of the bolt immediately below the jaws will strike said spring finger 65 and will force it inwardly toward the center of the machine, thus increasing the tension on the spring and creating an outward pressure on the bolt. The arm on the movable jaw clamping the bolt comes in contact with the stationary cam 41ª and this opens the jaw, thus releasing the bolt at the point where it is to be discharged. In order to insure the bolt being thrown clear of the holding jaws, we have provided a curved guide 63 which engages the shank of the bolt above the jaws.

In order to insure that the nut will be disengaged from the spool which turns the same on the bolt, so as to permit the assembled nut and bolt to be ejected, the chuck is moved downwardly so as to disengage it from the nut. This is accomplished by the cam 68 engaging the spring which holds the chuck raised. This cam also operates as soon as the bolt is discharged from the machine to position the chuck so that it will just clear the under side of the nut chute and be properly positioned to receive the nut ejected from the chute. This cam continues to control the action of the spring on the nut chuck until said nut chuck has passed the bolt chute after which the cam terminates and the spring comes into action to raise the chuck and hold the nut yieldingly pressed against the underneath side of the bolt chute and as soon as it passes the bolt chute and the bolt has been placed over the nut, it will yieldingly hold the nut against the end of the bolt until the nut engages the threads on the bolts.

If it happens during the operation of the machine that the nut fails to thread on to the bolt, so that the bolt only is ejected and the nut carried along with the turret, the nut in the chuck will engage the inclined ledge 22 which will force the rotating chuck downwardly and permit the nut and chuck to travel underneath the chute for the nuts.

Operation.

In its operation, the turret is continuously rotated by means of the power driven shaft 4. In its rotation, this turret carries the nut chucks and bolt jaws in continuous succession past the nut and bolt chutes. At these stations, the gravity fed nuts are transferred into the nut pockets by means of the Z-shaped transferring fingers. At the same time, the bolts are fed down the gravity bolt chutes, and are positioned on the bolt ledge against the periphery of the turret, being held in such position by the leaf springs, so that when the bolt jaws come opposite the bolt chute (the movable jaw of each bolt chuck having been opened by the cam 41ª) the projecting end of the movable jaw presses the bolt against the leaf springs and the latter in turn force the bolt into the open jaw. The lower end of the bolt rests on the track which operates to gage the bolt for subsequent gripping by the jaws. Just before leaving the track, the cam 41ª allows said jaws to grip the bolt. Previously, the cam track 68 has released the spring beneath the nut chuck and allowed it to rise against the under side of the bolt ledge. After passing the ledge, the spring further presses the nut chuck spindle upwardly into contact with the end of the bolt. Due to the floating grip of the nut and the self-centering formation of the nut chuck, the nut and bolt can move laterally to permit the threading of the nut on to the bolt. This is accomplished by means of the rotation of the nut chuck spools which come into peripheral contact with the belt drive. During the continued rotation of the turret, these nut chuck spools roll around the belt drive and thread the nuts on to the bolts. When the particular chuck reaches the ejector station, the bolt wipes backwardly the upper and lower ejector fingers against their spring tension. At the same time, the cam track engages over the edge of the projecting leaf spring 15, so that the nut chuck drops under its own weight, and practically simultaneously therewith, the cam 41ª opens the movable jaw which permits the ejector fingers under tension to kick out the assembled nut and bolt. On the continued rotation of the turret, the cam track 68 permits the nut chucks to rise slightly so that it just clears the under side of the nut chute. The upstanding projections 30 will engage the indexing finger which will rotate the nut chuck a predetermined angular distance so that the lateral sides of the nut socket formed by said projection are in position to register in parallelism with the lateral sides of the ledge on the nut chute. In passing beneath the nut ledge, the Z-shaped finger wipes over the top of the nut ledge, contacts with the nut on the nut ledge, and wipes it therefrom into the nut socket in the nut chuck. After accomplishing their purpose, the indexing finger and the two ejecting fingers are spring returned to a predetermined position fixed by stops. Continued rotation of the turret carries the nut chucks and bolt jaws past the nut and bolt chutes to the assembling position as heretofore described.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. In a nut and bolt assembling machine, the combination of a support, a nut chute thereon, a plurality of rotatable nut chucks on said support, means for translating said chucks past said nut chute, said nut chucks having a series of raised projections spaced to provide an open nut cup, and a conical upstanding centering pin arranged centrally and within said raised projections, and means for transferring a nut from said chute into said nut cup.

2. In a nut and bolt assembling machine, the combination of a support, a nut chute thereon, a plurality of rotatable nut chucks on said support, means for translating said chucks past said nut chute, means for transferring a nut from said chute into said chuck as it passes said chute, a bolt chute carried by said support and adjacent to said nut chute, bolt jaws mounted on said support in registering position with said chucks, means to translate said bolt jaws in timed relation with the translatory movement of said chucks, means for transferring a bolt from said bolt chute to a bolt jaw, means for causing said bolt jaws to automatically grip a bolt therein, means for moving said bolt jaw and chuck relatively toward each other subsequent to the passage of said chuck past said bolt chute, and means for rotating said nut chuck for spinning said nut upon said bolt.

3. In a nut and bolt assembling machine, the combination of a support, a nut chute thereon, a bolt chute thereon, a movable carrier, a series of nut chucks carried thereby and a series of bolt jaws carried thereby in registering relation with respect to said nut chucks, means for rotating said movable carrier to translate said nut chucks past the nut chute and the bolt jaws past the bolt chute, means for transferring the nuts from said chute to said nut chucks, and the bolts from said bolt chute to said bolt jaws, spring means for normally pressing said nut chucks toward said bolt jaws, cam means arranged to release said spring means, and means for rotating said nut chucks for ultimately threading said nuts on to said bolts.

4. In a nut and bolt assembling machine, the combination of a support, a rotatable carrier mounted thereon, a series of paired nut chucks and bolt jaws mounted on said carrier in registering relation, a nut chute carried by said support adjacent to the path of movement of said nut chucks, a bolt chute arranged on said support adjacent to the path of movement of said nut chucks, means for lowering each nut chuck at a predetermined time, and means for elevating said nut chucks, means for transferring a nut from said nut chute to said nut chuck, and a bolt from said bolt chute to said bolt jaws, and means for rotating said nut chucks whereby to spin said nuts on to said bolts.

5. In an automatic nut and bolt assembling machine, the combination of a support, a rotatable turret thereon, a bolt chute on said support adjacent the periphery of said turret, means for rotating said turret, said turret having a plurality of cutouts spaced on the periphery thereof, a movable jaw operating in each cutout, and means adapted to operate said jaw relatively to the contiguous wall of the cutout, said means being constructed and arranged to shift said jaw away from said cutout as it passes the bolt chute, whereby to permit entrance of the bolt, said means being thereafter adapted to move said jaw toward the wall of the cutout to grip the bolt.

6. In an automatic nut and bolt assembling machine, the combination of a support, a movable carrier thereon, a plurality of pairs of relatively movable jaws spaced apart on said carrier, a bolt chute mounted on said support in position to feed bolts to said jaws as they pass the bolt chute, said bolt chute including a horizontally disposed ledge adapted to support the bolt, means constructed and arranged to open said jaws as they pass the bolt chute and to thereafter close said jaws to grip the bolt, and means for transferring the bolts by a lateral movement thereof into said open bolt jaws as they pass the bolt chute.

7. In a nut and bolt assembling machine, the combination of a support, a rotatable turret thereon, a series of bolt jaws spaced on the periphery of said turret, an inclined bolt chute on said support in position to feed bolts to said jaws, the base of said bolt chute terminating in a ledge lying arcuately of the periphery of said turret in advance of the bolt chute and in the direction of travel of said turret for supporting the bolts until gripped by the jaws, and spring fingers constructed and arranged to press said bolt from the chute into the bolt jaws as said jaws pass the chute.

8. In a nut and bolt assembling machine, the combination of a support, a rotatable turret thereon having bolt jaws spaced about its periphery, an inclined bolt chute terminating in a ledge located arcuately with respect to the periphery of said turret and below the same so that the bolt is supported by said ledge with substantially an intermediate portion of the bolt opposite the bolt jaws, means for opening and closing said bolt jaws as they pass the bolt chute, and a pair of spring fingers arranged above and below said turret and in advance of said bolt chute to press the bolt into said jaws as the jaws pass the bolt chute.

9. In a nut and bolt assembling machine, the combination of a support, a rotatable turret mounted thereon and provided with a series of spaced cutout portions on its periphery, a bolt gripping jaw operating in each cutout portion and movable away from one wall of said cutout portion to permit the entry of a bolt, and movable toward said portion to grip said bolt, means for operating said movable jaw, a bolt chute carried on said support near the periphery of said turret, means for transferring the bolts from said chute into said cutout portion between the wall thereof and said open jaw, and a guard for preventing the passage of said bolt into the cutout portion between said movable jaw and the opposite wall of said cutout portion.

10. In an automatic nut and bolt assembling machine, the combination of a support, a rotatable turret thereon, a plurality of jaws having relatively movable parts adapted to grip the bolt therebetween, spring means for normally closing said jaws to frictionally grip the bolt, a bolt chute having a bolt positioning ledge constructed and arranged to position said bolt with the intermediate portion thereof opposite said bolt jaws, means for positively opening said jaws as they pass the bolt chute, means for transferring said bolt between said jaws and devices for turning a nut onto the bolt while held by said jaws.

11. In a completely automatic machine for assembling nuts and bolts, the combination of a support, a rotatable carrier thereon, nut chucks mounted on said carrier, bolt jaws mounted on said carrier in registration with said nut chucks, a nut chute for feeding nuts to the nut chuck, a bolt chute for feeding bolts to the bolt jaws, means for operating the bolt jaws to cause them to open and close at predetermined times, means for automatically feeding bolts from said bolt chute to said bolt jaws, means for automatically feeding nuts from said nut chute to said nut chucks, means for causing said nut chucks to approach said bolt jaws to contact the nuts with the bolts, and means for rotating said nut chucks to thread said nuts on said bolts.

12. In a completely automatic machine for assembling bolts and nuts, the combination of a support, a rotatable turret thereon, a plurailty of nut chucks thereon, means on said chucks for holding said nuts in predetermined position thereon and for permitting the automatic centering of said nuts, a plurality of bolt jaws mounted on said turret in registering relation with said nut chucks, said bolt jaws being constructed and arranged to hold said bolts in floating position over said nut chucks, a nut chute, a bolt chute, means for automatically transferring nuts from said nut chute to said chucks, means for automatically transferring bolts from said bolt chute to said jaws, means for causing said nut chucks and bolt jaws to approach each other relatively at predetermined times to contact said bolts with said nuts, and means for rotating said nut chucks to thread said nuts on said bolts.

13. In a completely automatic machine for assembling nuts and bolts, the combination of a support, a rotatable turret thereon, a plurality of nut chucks thereon, means on said nut chucks for holding said nuts in approximately predetermined position thereon and for permitting the automatic centering of said nuts, a plurality of bolt jaws mounted on said turret in registering relation with said nut chucks, said bolt jaws being constructed and arranged to hold said bolts in floating position over said nut chucks, a nut chute, a bolt chute, means for automatically transferring nuts from said nut chute to said chucks, means for automatically transferring bolts from said bolt chute to said jaws, means for causing said nut chucks and bolt jaws to approach each other relatively at predetermined times to contact said bolts with said nuts, means for rotating said nut chucks to thread said bolts on said jaws, means for causing said nut chucks and bolt jaws to recede relatively at predetermined times, and means for ejecting the assembled bolt and nut from said bolt jaws.

14. In a completed automatic machine for assembling nuts and bolts, the combination of a support, a rotatable turret thereon, a plurality of chucks having nut sockets, said nut sockets being constructed and arranged to permit the nut when placed therein to automatically center itself, a plurality of bolt jaws mounted on said turret above and directly registering with the nut chucks, a nut chute, a bolt chute, means to automatically feed the nuts from said nut chute into said nut chuck pocket, means to automatically feed the bolts to said bolt jaws, means to sequentially open and close said bolt jaws as they pass the bolt chute to thereby receive and hold said bolt in assembling position over said nut chucks, means to raise the nut chucks to bring the nut into contact with the bolts, means to rotate said nut chucks to thread said nut on the bolt, means for opening said bolt jaws at the discharging station, and means operated by the bolts for ejecting said bolts clear of said jaws and turret at said discharging point.

15. In a completely automatic machine for assembling nuts and bolts, the combination of a support, a lower turret rotatable thereon, a plurality of endwise shiftable spindles on said lower turret, a nut spool on each spindle, means on the upper face of each nut spool forming a nut receiving pocket, said means being constructed and arranged to permit the automatic centering of the nuts in said pocket, an upper turret having a plurality of stationary and movable jaws spaced thereon in registering relation with each nut chuck thereafter, a spring for normally maintaining said jaws in closed position, a lever connected to each movable jaw, a single cam for operating all of said levers to open said jaws at predetermined times, a nut chute, a bolt chute, means for automatically transferring the nuts from said nut chute into said nut socket, means for automatically transferring bolts from said bolt chute into said opened bolt jaws, a spring for each vertically movable nut chuck spindle for raising said nut chuck toward said bolt jaws to thereby contact said nut and bolt, a friction belt arranged to contact with said nut chuck spools to rotate them at predetermined times to thread the nuts on the bolts, and a cam adapted to lower the nut chucks at predetermined times, and automatic means for ejecting the assembled nut and bolt from said bolt jaws.

16. In a nut and bolt assembling machine, the combination of a support, a plurality of nut chucks movable in a vertical plane thereon, a plurality of bolt jaws arranged on said carrier above and registering with said nut chucks, a nut chute terminating in a ledge in position to deliver nuts to said nut chucks, a bolt chute terminating in a bolt ledge in substantially the same horizontal plane as the nut ledge, means for rotating said carrier to cause said nut chucks and bolt jaws to travel therearound and past said nut and bolt chutes, means for automatically causing the depression of said nut chucks so as to permit them to pass beneath the nut and bolt ledges, means for automatically transferring a nut from its ledge into said nut chuck and a bolt from its ledge into said bolt jaws, and means for automatically raising said nut chuck after it passes the bolt ledge to contact the nut and bolt, means for automatically spinning said nut chucks to thread said nuts on to said bolts, and means for automatically ejecting the assembled nuts and bolts.

17. In a machine for assembling nuts and bolts, the combination of a support, a lower turret carrying rotatable nut chucks, an upper turret carrying relatively movable bolt jaws, means to open and close said bolt jaws at predetermined times, means for automatically feeding nuts into said nut chucks, a bolt chute on said support including upper inclined spaced ways adapted to receive the bolt head therebetween, the lower inclined guideway adapted to support the lower end of the bolt in upright position, said lower guideway terminating in a ledge disposed arcuately about the periphery of said turret, and upper and lower leaf springs adapted to straddle said upper turret constructed and arranged to press said bolt into said bolt jaws on revolution of said turret, said springs being constructed and arranged to maintain said bolt upright during the pressing operation.

18. In a nut and bolt assembling machine, the combination of a support, a rotatable turret, nut chucks and bolt jaws carried by said turret in registering relation, means to feed nuts to said chucks and bolts to said jaws, means for threading said nuts on to said bolts during the rotation of said turret, a pivoted ejector mounted on said support, a spring for normally positioning said ejector in the path of movement of said bolt in the bolt jaws, whereby when each bolt approaches said ejector, the latter will be moved under the spring tension, and means for opening said bolt jaws after said ejector has been placed under tension to thereby eject the bolt from the jaws.

19. In a nut and bolt assembling machine, the combination of a support upper and lower turrets, relatively movable bolt jaws on said upper turret, a nut chuck mounted on said lower turret and beneath and in registering relation to each bolt jaw, means for rotating said turrets, means for feeding nuts to said nut chucks and bolts to said bolt jaws, means for causing said nut chucks to approach said bolt jaws to contact the nuts and bolts, means for rotating said nut chucks to thread the nuts upon the bolts, a bolt ejector pivotally mounted on said support, a spring for normally pressing said ejector in the path of movement of said bolt, means for causing the depression of each nut chuck as the bolt in the registering bolt jaw contacts with said ejector, and means for opening the bolt jaws at that time to permit the bolt to be thrown out by the ejector.

20. In a nut and bolt assembling machine, the combination of a support, a rotatable turret, a plurality of nut spools on said turret, said nut spools being constructed and arranged to form nut receiving pockets on their upper surface, a Z-shaped transferring arm on said turret and having a portion lying in spaced relation to the upper surface of said spool adjacent one edge of said pocket, a nut chute on said support terminating in an inwardly extending ledge, means for rotating said turret to cause said spools to pass beneath said nut ledge and said Z-shaped member to pass across the top of said nut ledge, and means for automatically depressing said spools to permit them to pass beneath said nut ledge.

21. In a nut and bolt assembling machine, the combination of a support, a turret, nut chucks and bolt jaws mounted on said turret in spaced registering relation, a nut chute on said support in position to feed nuts to said nut chuck as it passes thereby, a bolt chute mounted on said support in position to feed bolts to said bolt jaws as they pass thereby, means for continuously operating said turret, means for automatically transferring the nuts to said nut chucks and the bolts to said bolt jaws, means for automatically opening and closing said bolt jaws, to receive, hold and discharge said bolts, and means for automatically turning the nuts onto said bolts during the continued movement of said turret.

22. In an automatic nut and bolt assembling machine, the combination with a continuously rotatable turret, a plurality of rotatable nut chucks thereon, a plurality of cooperative bolt jaws on said turret, means for automatically feeding bolts to said bolt jaws, means for automatically feeding nuts to said nut chucks, and means for automatically causing said bolt jaws and nut chucks to approach each other relatively during the rotation of said turret to contact the nuts and bolts, and means for thereafter rotating said nut chucks to automatically thread the nuts on to the bolts.

23. In an automatic nut and bolt assembling machine, the combination of a rotatable turret, a plurality of rotatable spools mounted in spaced relation thereon, said spools forming nut receiving sockets, a plurality of bolt jaws on said turret in registration with said nut chucks, means for automatically feeding nuts and bolts to the chucks and jaws respectively during the rotation of said turret, means for automatically causing said nut chucks to move toward said bolt jaws during the rotation of said turret, and means to rotate said nut chucks as they move with said turret.

24. In an automatic nut and bolt assembling machine, the combination of a support, a rotatable turret thereon, a plurality of rotatable nut chucks mounted on said turret for movement therewith, a plurality of bolt jaws on said turret in position to register with said nut chucks, means for automatically feeding nuts and bolts to said chucks and jaws respectively during the rotation of said turret, means for causing said nut chucks to approach said bolt jaws, and a friction band mounted on said support in position to be engaged by said rotatable nut chucks as they move around with said turret.

25. In an automatic machine for assembling nuts and bolts, the combination of a support, a rotatable turret thereon, a plurality of spools spaced about the periphery of said turret and provided with nut receiving sockets in their upper faces, said spools being formed with belt guideways on their periphery, means for automatically moving said spools axially during their travel around with the turret, a friction band carried by said support and extending around said turret so as to engage the circumferential guide surfaces of said spools, a tension device for said band, means to feed nuts to said spools, a plurality of bolt jaws also carried by said turret in registry with said nut chucks, means to feed bolts to said bolt jaws, and means to cause the axial movement of said nut chucks to bring said nuts into engagement with said bolts whereby on rotation of said nut chucks, said nuts are threaded on to said bolts.

26. In an automatic nut and bolt assembling machine, the combination of a support, a rotatable turret thereon, a plurality of bolt jaws mounted on said turret, a plurality of rotatable nut chucks mounted on said turret beneath and in registering position with said bolt jaws, said nut chucks being mounted for axial movement, a nut chute having a delivering ledge located in a predetermined horizontal plane, a bolt chute having a delivering ledge, means for rotating said turret to cause said nut chucks and bolt jaws to pass said nut and bolt ledges respectively, a bolt ejector located in advance of said nut chute, means for rotating said nut chucks at predetermined times, means to normally force said nut chucks to their uppermost axial position, and means to cause the depression of said nut chucks when they pass to the receiving station, indexing mechanism arranged between the discharging station and the nut chute, and means on said nut chucks adapted to engage with said indexing mechanism for causing the correct positioning of a nut chuck as it approaches the nut chute.

27. In a nut and bolt assembling machine, the combination of a support, a nut chute adapted to deliver a series of nuts to a nut station, a movable carrier, a plurality of nut chucks mounted on said carrier, means for moving said carrier continuously to shift the chucks past the nut station, means to transfer each nut from said chute to a chuck as the latter passes the nut station and means for rotating the chucks while the carrier is in motion.

28. In a nut and bolt assembling machine, the combination of a support, a rotatable carrier, a series of nut chucks mounted for axial movement thereon, an ejector, an index finger, a nut chute, a bolt chute located on said support and positioned to be passed sequentially by a chuck on said rotatable carrier, and means for automatically causing said nut chuck to drop as it passes said ejector, and to rise to a predetermined height as it passes said indexing finger and said nut and bolt chutes, and to thereafter rise to a predetermined height on the continued movement of said rotatable carrier.

29. In a nut and bolt assembling machine, the combination of a support, a rotatable carrier thereon, a plurality of nut chucks mounted on said support and adapted to move axially, due to their own weight, springs for raising said nut chucks, a cam for lowering said nut chucks, an ejector, an indexing finger, a nut chute, and a bolt chute arranged sequentially about the edge of the rotatable carrier, said cam being constructed and arranged to cause said nut chucks to drop as they pass the ejector to rise to a predetermined height as they pass said indexing finger and nut and bolt chutes, and to rise to a second predetermined height as they continue to travel with the carrier.

30. A nut and bolt assembling machine, including in combination a support, a rotatable turret mounted thereon, a plurality of relatively movable jaws mounted in spaced relation about the periphery of said turret, spring means for normally closing said jaws to frictionally grip the bolt, a bolt chute on said support adjacent the periphery of the turret, means to positively open said jaws as they pass the bolt chute, and for transferring a bolt from the chute into said jaws, said friction means for gripping the bolt being of sufficient tension to hold the bolt upright and restraining the same from turning when threading nuts onto the bolt, said spring means yielding to permit the bolt to turn to prevent stripping of the threads, or the forcing of the nut on too tight to be removed by hand.

31. In a nut and bolt assembling machine, the combination of a support, a nut chute thereon, a plurality of nut chucks on said support, means for rotating said chucks, means for translating said chucks past said nut chute, means for transferring a nut from said chute into said chuck as it passes said chute, means carried by each nut chuck for centering the nut relative to the chuck, and means for causing said nut to rotate with the chuck.

32. In a nut and bolt assembling machine, the combination of a support, a nut chute thereon, a plurality of nut chucks on said support, means for rotating said chucks, means for translating said chucks past said nut chute, means for transferring a nut from said chute into said chuck as it passes said chute, means carried by each nut chuck for centering the nut relative to the chuck, means for causing said nut to rotate with the chuck, means associated and traveling with each nut chuck for supporting a bolt, a bolt chute carried by said support, devices for feeding the bolts one at a time from said chute into the traveling supporting means therefor, and means for moving said bolt support and chuck relatively toward each other for turning the nut carried by the chuck on to said bolt.

In testimony whereof, I affix my signature.

LEONARD OBER.